United States Patent
Peng et al.

(10) Patent No.: US 11,546,089 B2
(45) Date of Patent: Jan. 3, 2023

(54) METHODS AND DEVICES FOR DATA TRANSMISSION AND PROCESSING, NETWORK SIDE APPARATUS, AND TERMINAL

(71) Applicant: ZTE CORPORATION, Guangdong (CN)

(72) Inventors: Focai Peng, Shenzhen (CN); Saijin Xie, Shenzhen (CN); Mengzhu Chen, Shenzhen (CN); Jun Xu, Shenzhen (CN); Jin Xu, Shenzhen (CN); Cuihong Han, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 26 days.

(21) Appl. No.: 16/676,559

(22) Filed: Nov. 7, 2019

(65) Prior Publication Data

US 2020/0076536 A1    Mar. 5, 2020

Related U.S. Application Data

(63) Continuation of application No. PCT/CN2018/087219, filed on May 17, 2018.

(30) Foreign Application Priority Data

May 22, 2017    (CN) .......................... 201710362907.6

(51) Int. Cl.
*H04L 1/00* (2006.01)
*H04W 72/00* (2009.01)
*H04W 72/04* (2009.01)

(52) U.S. Cl.
CPC .......... *H04L 1/0061* (2013.01); *H04L 1/0057* (2013.01); *H04L 1/0059* (2013.01); *H04W 72/005* (2013.01); *H04W 72/0466* (2013.01)

(58) Field of Classification Search
None
See application file for complete search history.

(56) References Cited

U.S. PATENT DOCUMENTS

| 2011/0149886 A1 | 6/2011 | Xu et al. |
| 2015/0085717 A1 | 3/2015 | Papasakellariou et al. |

(Continued)

FOREIGN PATENT DOCUMENTS

| CN | 101645722 A | 2/2010 |
| CN | 103944663 A | 7/2014 |

(Continued)

OTHER PUBLICATIONS

R1-1707182 ZTE "Further Consideration on Polar codes with maximum mother code size" 3GPP TSG RAN WG 1 Meeting #89 May 15-19, 2017 (Year: 2017).*

Ericsson: "Coding Techniques for NR-PBCH" 3GPP TSG RAN WG1 Meeting #89; R1-1707080; May 19, 2017; Hangzhou, P.R. China (10 Pages).

(Continued)

*Primary Examiner* — Basil Ma
(74) *Attorney, Agent, or Firm* — Foley & Lardner LLP

(57) ABSTRACT

Provided are a method and apparatus for sending data, a method and apparatus for processing data, as well as a network side device and a terminal. The method for sending data includes: performing first predetermined processing on data to be transmitted to obtain a first processing result; concatenating the first processing result with the data to be transmitted to obtain concatenated data; performing second predetermined processing on the concatenated data to obtain processed data; and transmitting a segment of data in the processed data and corresponding to a current data transmission of a network side device.

8 Claims, 3 Drawing Sheets

(56) References Cited

U.S. PATENT DOCUMENTS

| | | | |
|---|---|---|---|
| 2015/0181576 A1 | 6/2015 | Papasakellariou et al. | |
| 2015/0271006 A1 | 9/2015 | Han et al. | |
| 2016/0173231 A1* | 6/2016 | Yasukawa | H04L 1/0061 |
| | | | 455/424 |
| 2017/0134137 A1 | 5/2017 | Kuchibhotla et al. | |
| 2018/0331693 A1* | 11/2018 | Lou | H03M 13/15 |
| 2019/0181980 A1* | 6/2019 | Lou | H04L 1/0041 |
| 2019/0268025 A1* | 8/2019 | Shen | H03M 13/27 |

FOREIGN PATENT DOCUMENTS

| | | |
|---|---|---|
| CN | 106301742 A | 1/2017 |
| CN | 106330391 A | 1/2017 |
| CN | 106850162 A | 6/2017 |
| EP | 3 316 615 A1 | 5/2018 |
| JP | 2015-023509 A | 2/2015 |
| JP | 2015-165682 A | 9/2015 |
| JP | 2016-500209 A | 1/2016 |
| JP | 2017-514325 A | 6/2017 |
| KR | 20160099100 A | 8/2016 |
| WO | WO-2015/142469 A1 | 9/2015 |
| WO | WO-2015/188337 A1 | 12/2015 |
| WO | WO-2016/126142 A1 | 8/2016 |
| WO | WO-2017/002794 A1 | 1/2017 |

OTHER PUBLICATIONS

First Office Action for JP Appl. No. 2019-564155, dated Feb. 4, 2021 (with English translation, 16 pages).

MediaTek Inc.: "DCI Aggregation in 2-stage DCI", 3GPP TSG RAN WG1 Meeting #88 R1-1702723, Athens, Greece, Feb. 13-17, 2017 (5 pages).

ZTE: "Further consideration on Polar codes with maximum mother code" 3GPP TSG RAN WG1 Meeting #89; R1-1707182; May 19, 2017; Hangzhou, China (16 pages).

International Search Report and Written Opinion for International Appl. No. PCT/CN2018/087219, dated Aug. 14, 2019.

First Singapore Office Action on Appl. No. 11201911049T dated Sep. 14, 2020 (10 Pages).

First Office Action for KR Appl. No. 10-2019-7037667, dated Nov. 24, 2020 (with English translation, 10 pages).

European Search Report on EP Appln. No. 18806002.4 dated May 20, 2020 (7 pages).

First Office Action for CN Appl. No. 2017103629076, dated Jan. 5, 2022 (7 pages).

E. Dahlman et al., "4G: LTE/LTE-Advanced for Mobile Broadband, Second Edition" First Volume, Maruzen Publishing Co., Lts., Oct. 20, 2015, ISBN978-4-621-08952-1, p. 172 (6 pages).

Official Action on JP Appl. No. 2019-564155, dated Jul. 21, 2022 (with English translation, 11 pages).

* cited by examiner

METHODS AND DEVICES FOR DATA TRANSMISSION AND PROCESSING, NETWORK SIDE APPARATUS, AND TERMINAL

CROSS-REFERENCE TO RELATED APPLICATIONS

This application claims the benefit of priority under 35 U.S.C. § 120 as a continuation of PCT Patent Application No. PCT/CN2018/087219 filed on May 17, 2018, which claims priority to Chinese patent application No. 201710362907.6 filed on May 22, 2017, the disclosure of each of which is incorporated herein by reference in its entirety.

TECHNICAL FIELD

The present invention relates to the field of communications and in particular, to a method and apparatus for sending data, a method and apparatus for processing data, a network side device and a terminal.

BACKGROUND

In the long term evolution (LTE) system in the related art, a physical broadcast channel (PBCH) is transmitted once every 10 ms in a period of 40 ms (i.e., 4 times within 40 ms). The user equipment (UE) determines which transmission is being performed by speculating the redundancy version used for the base station to perform channel coding on the PBCH.

When the LTE base station performs channel coding on the PBCH, different masks (e.g., CRC masks) are used for representing the number (1 or 2 or 4) of antenna ports when the cyclic redundancy check (CRC) is performed on the PBCH. In the related art, when the LTE base station transmits a PBCH using multiple antennas, a transmit diversity method is used.

In the transmit period of 80 ms of a physical broadcast channel for new radio access technology (NR-PBCH) in the 5th generation mobile communication system (5G), the NR-PBCH may be transmitted multiple times, while the UE (terminal) does not know which transmission is being performed. Therefore, a certain method is needed to make the UE know which transmission is being performed. In the future, the base station may transmit the NR-PBCH by using a single antenna or multiple antennas; and the base station may transmit the NR-PBCH by using a single beam or multiple beams. Therefore, the UE needs to know the number of antennas (the number of antenna ports) and the beam condition to better receive the channel.

No effective solution has yet been proposed for the preceding problem in 5G.

SUMMARY

A method and apparatus for sending data, a method and apparatus for processing data, a network side device and a terminal are provided in the embodiments of the present invention to at least solve the problem, in the related art, that the terminal cannot determine the received data is transmitted by the network side in which transmission.

A method for sending data is provided in an embodiment of the present invention. The method includes: performing first predetermined processing on data to be transmitted to obtain a first processing result; concatenating the first processing result with the data to be transmitted to obtain concatenated data; performing second predetermined processing on the concatenated data to obtain processed data, where the processed data includes a plurality of segments of data, and each segment of the plurality of segments of data corresponds to a data transmission; and transmitting a segment of data in the processed data and corresponding to a current data transmission of a network side device.

A method for processing data is provided in an embodiment of the present invention. The method includes: receiving data sent by a network side device, where the data is a segment of data among data obtained from pre-processing data to be transmitted by the network side device; and determining, according to preset correspondence between segments of data and the numbers of data transmissions and the received data, the number of data transmissions corresponding to the received data.

An apparatus for processing data is provided in an embodiment of the present invention. The apparatus includes a reception module and a determination module. The reception module is configured to receive data sent by a network side device, where the data is a segment of data among data obtained from pre-processing data to be transmitted by the network side device. The determination module is configured to determine, according to preset correspondence between segments of data and the numbers of data transmissions and the received data, the number of data transmissions corresponding to the received data.

A network side device is provided in an embodiment of the present invention and includes a processor and a memory. The processor is configured to perform first predetermined processing on data to be transmitted to obtain a first processing result; combine the first processing result with the data to be transmitted to obtain concatenated data; perform second predetermined processing on the concatenated data to obtain processed data; and transmit a segment of data in the processed data and corresponding to a current data transmission of the network side device, where the processed data includes a plurality of segments of data, and each segment of the plurality of segments of data corresponds to a data transmission. The memory is coupled to the processor.

A terminal is provided in an embodiment of the present invention and includes a processor and a memory. The processor is configured to receive data sent by a network side device, and determine, according to preset correspondence between segments of data and the numbers of data transmissions and the received data, the number of data transmissions corresponding to the received data, where the data is a segment of data among data obtained from pre-processing data to be transmitted by the network side device. The memory is coupled to the processor.

Another embodiment of the present invention further provides a storage medium. The storage medium includes stored programs which, when executed, perform the method of any one of the embodiments described above.

Another embodiment of the present invention further provides a processor. The processor is configured to execute programs which, when executed, perform the method of any one of the embodiments described above.

Through the embodiments, the first predetermined processing is performed on the data to be transmitted to obtain the first processing result, and the first processing result is concatenated with the data to be transmitted. The second predetermined processing is performed on the concatenated data. The processed data includes a plurality of segments of data, and each segment of the plurality of segments of data corresponds to a data transmission. A segment of data corresponding to a current data transmission of a network side device is transmitted. That is, each segment of data corresponds to a data transmission, so that the terminal may determine the number of transmissions corresponding to data after the terminal receives the data sent by the network side device, and further determine the number of transmissions of the data transmitted by the network side device. Therefore the problem that the terminal cannot determine which of the transmissions the received data is transmitted by the network side can be solved.

BRIEF DESCRIPTION OF DRAWINGS

The drawings described herein are used to provide a further understanding of the present invention and form a part of the present application. The exemplary embodiments and descriptions thereof in the present invention are used to explain the present invention and not to limit the present invention in any improper way. In the drawings.

DETAILED DESCRIPTION

The present invention will be described hereinafter in detail with reference to the drawings in conjunction with the embodiments. It is to be noted that if not in collision, the embodiments and features therein in the present application may be concatenated with each other.

It is to be noted that the terms "first", "second" and the like in the description, claims and drawings of the present invention are used to distinguish between similar objects and are not necessarily used to describe a particular order or sequence.

Embodiment 1

Figure 1:
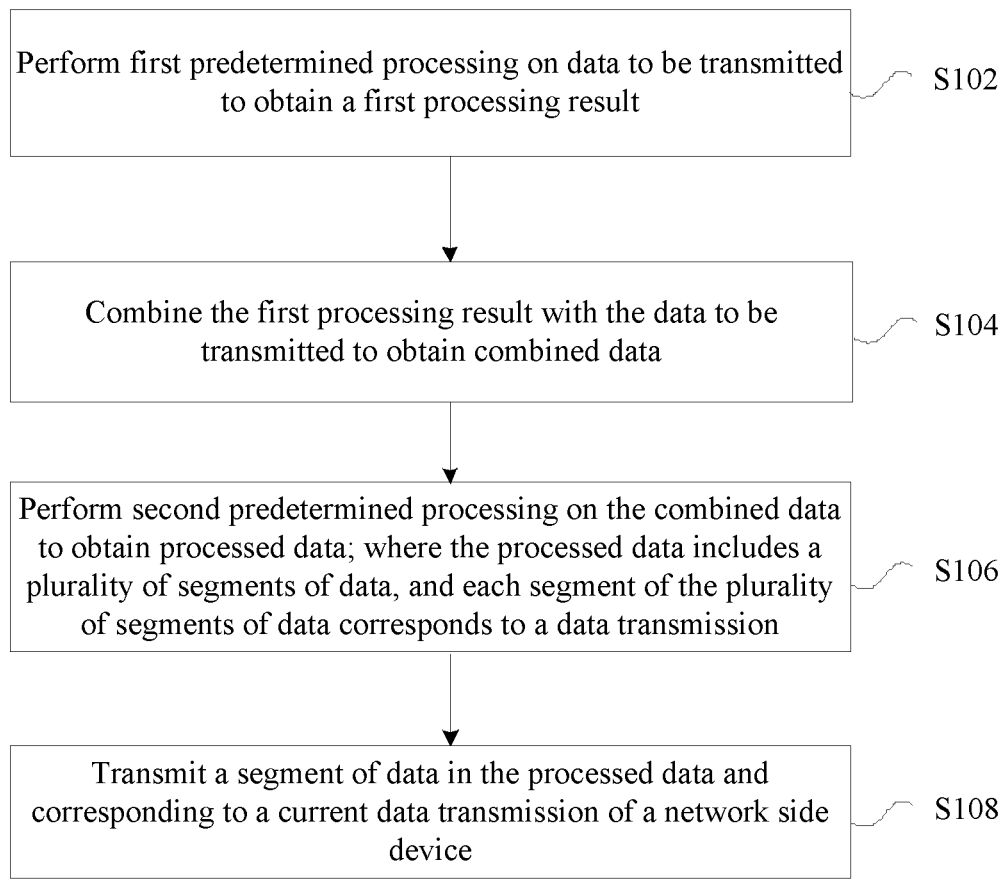
FIG. 1 is a flowchart of a method for sending data according to an embodiment of the present invention.

The embodiment of the present invention provides a method for sending data. FIG. 1 is a flowchart of the method for sending data according to the embodiment of the present invention. As shown in FIG. 1, the method includes the steps described below.

In S102, first predetermined processing is performed on data to be transmitted to obtain a first processing result.

In S104, the first processing result is concatenated with the data to be transmitted to obtain concatenated data.

In S106, second predetermined processing is performed on the concatenated data to obtain processed data.

The processed data includes a plurality of segments of data, and each segment of the plurality of segments of data corresponds to a data transmission.

In S108, a segment of data in the processed data and corresponding to a current data transmission of a network side device is transmitted.

Through the above steps, the first predetermined processing is performed on the data to be transmitted to obtain the first processing result, and the first processing result is concatenated with the data to be transmitted. The second predetermined processing is performed on the concatenated data. The processed data includes a plurality of segments of data, and each segment of the plurality of segments of data corresponds to a data transmission. A segment of data corresponding to a current data transmission of a network side device is transmitted. That is, each segment of data corresponds to a data transmission, so that the terminal may determine the number of transmissions corresponding to data after the terminal receives the data sent by the network side device, and further determine the number of transmissions of the data transmitted by the network side device. Therefore the problem that the terminal cannot determine in which transmission the received data is transmitted by the network side can be solved.

In other embodiments, the step S106 may include: performing channel coding on the concatenated data to obtain coded data; repeating the coded data for N times to obtain repeated data, where N is a positive integer; and scrambling the repeated data by using a specified identifier to obtain scrambled data.

It is to be noted that the above specified identifier may, but may not necessarily, include at least one of: a beam identifier, a cell identifier, or a set of terminal identifiers.

It is to be noted that the channel coding is performed on the concatenated data in at least one of following coding manners: a polar code, a low-density parity check code, and a tail biting convolutional code.

It is to be noted that the step of scrambling the repeated data by using the specified identifier to obtain the scrambled data may include: performing an exclusive OR (XOR) operation on a scrambling sequence generated by using the specified identifier and the repeated data to obtain the scrambled data.

It is to be noted that the scrambling sequence includes at least one of: a Gold code, an M-sequence or a zadoff-chu (ZC) sequence.

It is to be noted that the Gold code is a pseudo-random code derived from the M-sequence, and is formed by a modulo-2 addition to displacement of a pair of the M-sequence. The M-sequence is an abbreviation of a maximum length linear shift register sequence, and is a pseudo random sequence, a pseudo noise code or a pseudo random code. The ZC sequence is a Zadoff-Chu sequence.

In other embodiments, the above step S102 may include: performing a cyclic redundancy check on the data to be transmitted to obtain first check result; and performing at least one of following operations on the first check result to obtain the first processing result: performing a predetermined operation on the first check result by using a mask for representing the number of antenna ports; and performing an XOR operation on a cell radio network temporary identifier and the first check result. The step of performing the XOR operation on the cell radio network temporary identifier and the first check result includes: performing the XOR operation on a 16-bit cell radio network temporary identifier and last 16 bits in 19 bits of the first check result to obtain a new check result. Since the lengths are different, in operation, the last 16 bits in 19 bits of the first check result are selected for operation with the 16-bit cell radio network temporary identifier to obtain the new check result.

It is to be noted that in a case of 8 check bits used for the cyclic redundancy check, a generator polynomial g used in performing the cyclic redundancy check includes at least one of: $g=X^8+X^7+X^4+X^3+X+1$, $g=X^8+X^2+X+1$, $g=X^8+X^4+X^3+X+1$, or $g=X^8+X^4+X^3+X^2+1$; in a case of 16 check bits used for the cyclic redundancy check, the generator polynomial g used in performing the cyclic redundancy check includes at least one of: $g=X^{16}+X^{12}+X^5+1$, $g=X^{16}+X^2+X+1$, or $g=x16+X^{14}+X+1$; in a case of 17 check bits used for the cyclic redundancy check, the generator polynomial g used in performing the cyclic redundancy check includes at least one of: $g=X^{17}+X^3+1$, $g=X^{17}+X^{12}+X^{11}+X^6+X^4+X+1$, or $g=X^{17}+X^{13}+X^{11}+X^{10}+X^7+X^5+X^4+X^3+X+1$; in a case of 18 check bits used for the cyclic redundancy check, the generator polynomial g used in performing the cyclic redundancy check includes at least one of: $g=X^{18}+X^5+X^2+X+1$, $g=X^{18}+X^{16}+X^{15}+X^{13}+X^8+X^5+X^4+X^3+X^2+X+1$, or $g=X^{18}+X^{16}+X^{11}+X^{10}+X^9+X^8+X^6+X^5+X^4+X+1$; in a case of 19 check bits used for the cyclic redundancy check, the generator polynomial g used in performing the cyclic redundancy check includes at least one of: $g=X^{19}+X^5+X^2+X+1$, $g=X^{19}+X^{16}+X^8+X^5+X^4+X^3+X^2+X+1$, or $g=X^{19}+X^{12}+X^9+X^8+X^6+X^5+X^4+X^2+1$; in a case of 20 check bits used for the cyclic redundancy check, the generator polynomial g used in performing the cyclic redundancy check includes at least one of: $g=X^{20}+X^3+1$, $g=X^{20}+X^{16}+X^9+X^4+X^3+X^2+1$, or $g=X^{20}+X^{19}+X^{18}+X^{14}+X^6+X^2+X+1$; in a case of 21 check bits used for the cyclic redundancy check, the generator polynomial g used in performing the cyclic redundancy check includes at least one of: $g=X^{21}+X^2+1$, $g=X^{21}+X^{20}+X^{13}+X^{11}+X^7+X^4+X^3+1$, or $g=X^{21}+X^{20}+X^{18}+X^{16}+X^{14}+X^{13}+X^{10}+X^9+X^7+X^3+1$; in a case of 22 check bits used for the cyclic redundancy check, the generator polynomial g used in performing the cyclic redundancy check includes at least one of: $g=X^{22}+X+1$; in a case of 23 check bits used for the cyclic redundancy check, the generator polynomial g used in performing the cyclic redundancy check includes at least one of: $g=X^{23}+X^5+1$; in a case of 24 check bits used for the cyclic redundancy check, the generator polynomial g used in performing the cyclic redundancy check includes at least one of: $g=X^{24}+X^4+X^3+X+1$, $g=X^{24}+X^{23}+X^6+X^5+X+1$, or $g=X^{24}+X^{23}+X^{18}+X^{17}+X^{14}+X^{11}+X^{10}+X^7+X^6+X^5+X^4+X^3+X+1$; and in a case of 32 check bits used for the cyclic redundancy check, the generator polynomial g used in performing the cyclic redundancy check includes at least one of: $g=X^{32}+X^7+X^5+X^3+X^2+X+1$, $g=X^{32}+X^{29}+X^{18}+X^{14}+X^3+1$, or $g=X^{32}+X^{14}+X^{12}+X^{10}+X^9+X^8+X^4+X^3+X+1$. A power exponent of X is used for indicating a check bit used in in performing the cyclic redundancy check.

It is to be noted that in a case where the antenna port is a single-antenna port, the mask includes the number L_CRC of binary bits "0". In a case where the antenna port is a 2-antenna port, the mask includes the number L_CRC of binary bits "1". In a case where the antenna port is a 4-antenna port, the mask includes: the number floor (L_CRC/2) of binary strings "01" and the number mod (L_CRC, 2) of binary bits "0". In a case where the antenna port is an 8-antenna port, the mask includes: the number floor(L_CRC/2) of binary strings "10" and the number mod(L_CRC, 2) of binary bits "1". In a case where the antenna port is a 16-antenna port, the mask includes one of: the number floor(L_CRC/4) of binary strings "0110" and the number mod(L_CRC, 4) of binary bits "1"; the floor (L_CRC/4) binary strings "0110" and a plurality of bits from a first bit to a mod(L_CRC, 4)-th bit of the floor(L_CRC/4) binary strings "0110"; or the floor(L_CRC/4) binary strings "0110" and a plurality of bits from a last bit to a mod (L_CRC, 4)-th bit from the last bit of the floor(L_CRC/4) binary strings "0110". In a case where the antenna port is a 32-antenna port, the mask includes one of: the number floor(L_CRC/4) of binary strings "1001" and the number mod(L_CRC, 4) of binary bits "0"; the floor(L_CRC/4) binary strings "1001" and a plurality of bits from a first bit to a mod(L_CRC, 4)-th bit of the floor(L_CRC/4) binary strings "1001"; or the floor(L_CRC/4) binary strings "1001" and a plurality of bits from a last bit to a mod(L_CRC, 4)-th bit from the last bit of the floor(L_CRC/4) binary strings "1001". L_CRC includes at least one of: the number of bits of the cyclic redundancy check, the number of bits of a cell identifier, the number of bits of a beam identifier, the number of bits of the cell radio network temporary identifier, or the number of bits of the number of bits of the cyclic redundancy check minus the number of reserved bits. The number of reserved bits is any integer from 0 to 16, floor( ) is a round-down operation, mod(L_CRC, 2) is a modulo-2 operation on the L_CRC, and mod(L_CRC, 4) is a modulo-4 operation on the L_CRC.

It is to be noted that the step of performing the predetermined operation on the first check result by using the mask for representing the number of the antenna ports includes at least one of: performing the XOR operation on the mask and the first check result; or performing a modulo-2 addition operation on the mask and the first check result.

It is to be noted that the step of performing the XOR operation on the cell radio network temporary identifier and the first check result includes at least one of: in a case where the number of bits of the cell radio network temporary identifier is less than the number of bits of the first check result, adding the predetermined number of binary bits "0" to a head or tail of the cell radio network temporary identifier to obtain a first cell radio network temporary identifier, and performing the XOR operation on the first cell radio network temporary identifier and the first check result; or in a case where the number of bits of the cell radio network temporary identifier is greater than the number of bits of the first check result, adding the predetermined number of binary bits "0" to a head or tail of the first check result to obtain a second check result, and performing the XOR operation on the cell radio network temporary identifier and the second check result. The predetermined number is an absolute value of a difference between the number of bits of the cell radio network temporary identifier and the number of bits of the first check result.

In other embodiments, the above step S104 may include at least one of: placing the first processing result before the data to be transmitted to obtain the concatenated data; placing the first processing result in the middle of the data to be transmitted to obtain the concatenated data; or placing the first processing result after the data to be transmitted to obtain the concatenated data. Every M data bits to be transmitted in the data to be transmitted are inserted with a bit of data of the first processing result and all bits of the first processing result are inserted into the data to be transmitted to obtain the concatenated data. M is a natural number.

It is to be noted that at least two segments of data in a plurality of segments of data have overlapping data, or no overlapping data exists in the plurality of segments of data, and the present invention is not limited thereto.

It is to be noted that the above-mentioned steps may, but are not limited to, be performed by a network side device, such as a base station.

Embodiment 2

Figure 2:
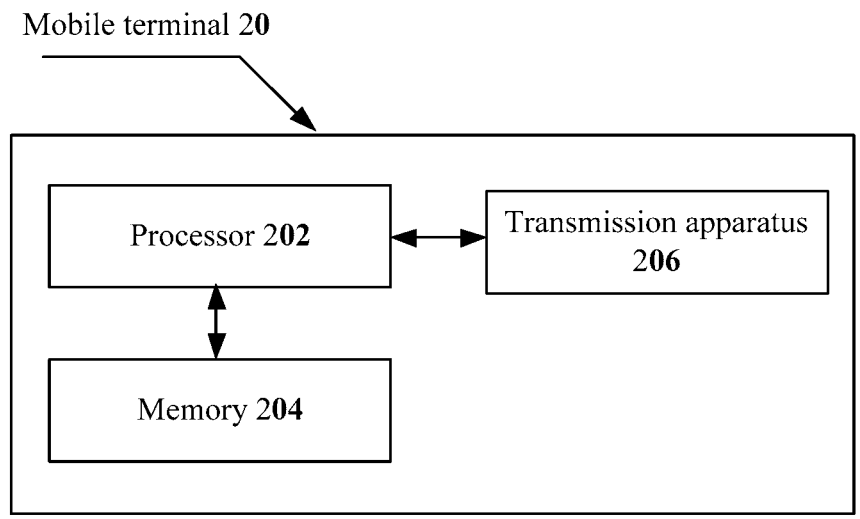
FIG. 2 is a structural block diagram of hardware of a mobile terminal for a method for processing data according to an embodiment of the present invention.

A method embodiment provided by the embodiment 2 of the present application may be executed on a mobile terminal, a computer terminal or other similar computing apparatuses. Taking the method to be executed in the mobile terminal as an example, FIG. 2 is a structural block diagram of hardware of a mobile terminal for a method for processing data according to the embodiment of the present invention. As shown in FIG. 2, a mobile terminal 20 may include one or more (only one is shown in FIG. 1) processors 202 (the processors 202 may include, but are not limited to, a processing apparatus such as a microcontroller unit (MCU) and a field programmable gate array (FPGA)), a memory 204 configured to store data, and a transmission apparatus 206 configured to implement a communication function. It should be understood by those skilled in the art that the structure shown in FIG. 2 is merely illustrative, and not intended to limit the structure of the electronic apparatus described above. For example, the mobile terminal 20 may further include more or fewer components than that shown in FIG. 2, or may have a configuration different from the configuration shown in FIG. 2.

The memory 204 may be configured to store software programs of application software and modules, such as program instructions/modules corresponding to the method for processing data in the embodiments of the present invention. The processor 202 executes the software programs and modules stored in the memory 204 to perform function applications and data processing, to implement the method described above. The memory 204 may include a high-speed random access memory, and may further include a nonvolatile memory, such as one or more magnetic storage apparatuses, flash memories or other nonvolatile solid-state memories. In some examples, the memory 204 may further include memories that are remotely disposed with respect to the processors 202. These remote memories may be connected to the mobile terminal 20 via a network. Examples of the preceding network include, but are not limited to, the Internet, an intranet, a local area network, a mobile communication network and a combination thereof.

The transmission apparatus 206 is configured to receive or send data via a network. Specific examples of such a network described above may include a radio network provided by a communication provider of the mobile terminal 20. In one example, the transmission apparatus 206 includes a network interface controller (NIC), which may be connected to other network devices via a base station and thus is capable of communicating with the Internet. In one example, the transmission apparatus 206 may be a radio frequency (RF) module, which is used for communicating with the Internet in a radio way.

Figure 3:
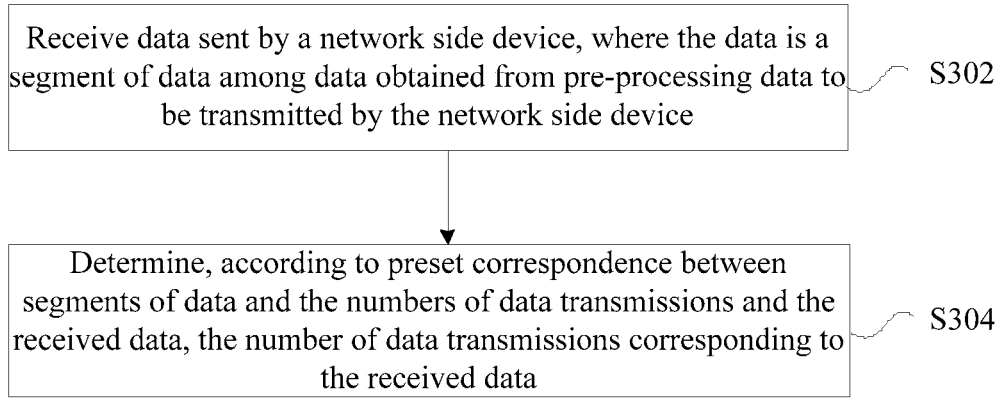
FIG. 3 is a flowchart of the method for processing data according to the embodiment of the present invention.

The embodiment provides a method for processing data to be executed in the mobile terminal described above. FIG. 3 is a flowchart of the method for processing data according to the embodiment of the present invention. As shown in FIG. 3, the method includes the steps described below.

In S302, data sent by a network side device is received. The data is a segment of data among data obtained from pre-processing data to be transmitted by the network side device.

In S304, the number of data transmissions corresponding to the received data is determined according to preset correspondence between segments of data and the numbers of data transmissions and the received data.

Through the above steps, the number of data transmissions corresponding to the received data is determined according to preset correspondence between segments of data and the numbers of data transmissions, so that the terminal knows which of transmissions the received data is transmitted by the network side, thereby solving the problem that the terminal cannot determine that the received data is transmitted by the network side in which transmission.

It is to be noted that the correspondence may be predefined between the network side device and the terminal, and may also be configured in advance by the network side device for the terminal, but is not limited thereto.

It is to be noted that the correspondence may include: correspondence between starting points of the segments of data in the pre-processed data and the numbers of data transmissions.

In other embodiments, the above step S304 may include that a starting position of the received data in the pre-processed data is obtained; and the correspondence is searched according to the starting position for the number of data transmissions matching the starting position.

It is to be noted that the above steps may, but may not necessarily, be performed by a terminal.

From the description of the embodiment described above, it will be apparent to those skilled in the art that the method in the embodiment described above may be implemented by software plus a necessary general-purpose hardware platform, or may of course be implemented by hardware. Based on this understanding, the solutions provided by the present invention substantially, or the part contributing to the related art, may be embodied in the form of a software product. The computer software product is stored in a storage medium (such as an ROM/RAM, a magnetic disk or an optical disk) and includes several instructions for enabling a terminal device (which may be a mobile phone, a computer, a server, a network device, or the like) to perform the method according to each embodiment of the present invention.

To better understand the embodiments of the present invention, the present invention will be further described below in conjunction with the following embodiments.

Embodiment 1

It is assumed that a length of the data to be transmitted is 23 bits, a length of the CRC is 19 bits, the polar code is used for performing coding, a length of the mother code of the polar code is 512 bits, a single antenna is used for transmission, 4 repetitions are made after coding (i.e., 4*512=2048 bits), eight transmissions are needed, and currently the 3th transmission is performed. Then, the transmitter performs the following operations. A 19-bit cyclic redundancy check on 23-bit data to be transmitted is performed by using the following formula generator polynomial to obtain a 19-bit check result:

$$g=X^{19}+X^5+X^2+X+1.$$

Then, the XOR operation is performed on the 19-bit check result by using a mask for representing the number of antenna ports to obtain a new check result. Since the single antenna is used for transmission, the 19-bit check result remains unchanged.

Then, the new check result is concatenated with the data to be transmitted to obtain 42-bit new data (the 19-bit check result is placed after 23-bit data to be transmitted).

The polar code coding is then performed on the 42-bit new data with a code rate of 1/12, and 512-bit coded data is obtained.

The 512-bit coded data is repeated for 4 times to obtain 2048-bit data.

The 2048-bit data is scrambled by using a beam identifier to obtain 2048-bit scrambled data.

The third segment of data of the above scrambled data is extracted and transmitted.

Figure 4:
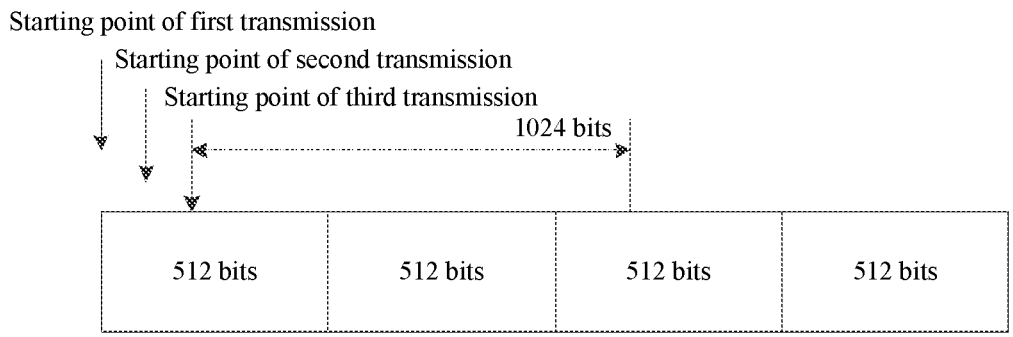
FIG. 4 is a schematic diagram of extracted bits according to an embodiment 1 of the present invention.

In the scrambled data, the starting point of each segment is mod(L_Mother*Repeat, Num_Seg)+(Seg_ID−1)*floor (L_Mother/Num_Seg). L_Mother is the length of the mother code, Num_Seg is the total number of transmissions, and Seg_ID is the current number of transmissions. The sequence number of a starting bit of the third transmission is mod (512*4, 8)+(3−1)*floor(512/8)=0+2*64=128, that is, the 128th bit (the sequence number starts from 0; and the number range is 0, 1, 2, 3, . . . , 2046, 2047). The number of bits transmitted each time is 512 or 1024 or 1536. FIG. 4 is a schematic diagram of extracted bits according to the embodiment 1 of the present invention. The extracted bits are as shown in FIG. 4.

Embodiment 2

It is assumed that a length of the data to be transmitted is 22 bits, a length of the CRC is 20 bits, the polar code is used for performing coding, a length of the mother code of the polar code is 512 bits, eight antenna ports are used for transmission, 4 repetitions are made after coding (i.e., the length is 4*512=2048 bits), eight transmissions are needed, and currently the 3th transmission is performed. Then, the transmitter performs the following operations. A 20-bit cyclic redundancy check is performed on 22-bit data to be transmitted by using the following formula generator polynomial to obtain a 20-bit check result:

$$g=X^{20}+X^{16}+X^9+X^4+X^3+X^2+1.$$

Then, the XOR operation is performed on the 20-bit check result by using a mask for representing the number of antenna ports to obtain a new check result. Since eight antennas are used for transmission, the XOR operation needs to be performed on the 20-bit check result by using the mask [1, 0, 1, 0, 1, 0, 1, 0, 1, 0, 1, 0, 1, 0, 1, 0, 1, 0, 1, 0] to obtain a 20-bit new check result. Then, the 20-bit new check result is concatenated with the data to be transmitted to obtain 42-bit new data (the 20-bit check result is placed to the head of the 22-bit data to be transmitted). The polar code coding is then performed on the 42-bit new data with a code rate of 1/12, and 512-bit coded data is obtained.

The 512-bit coded data is repeated for 4 times to obtain 2048-bit data.

The 2048-bit data is scrambled by using a beam identifier to obtain 2048-bit scrambled data.

The third segment of data of the above scrambled data is extracted and transmitted.

In the scrambled data, the starting point of each segment is mod(L_Mother*Repeat, Num_Seg)+(Seg_ID−1)*floor (L_Mother/Num_Seg). L_Mother is the length of the mother code, Num_Seg is the total number of transmissions, and Seg_ID is the current number of transmissions. The sequence number of a starting bit of the third transmission is mod(512*4, 8)+(3−1)*floor(512/8)=0+2*64=128, that is, the 128th bit (the sequence number starts from 0; and the number range is 0, 1, 2, 3, . . . , 2046, 2047). The number of bits transmitted each time is 512 or 1024 or 1536. The extracted bits are as shown in FIG. 4.

Embodiment 3

It is assumed that a length of the data to be transmitted is 23 bits, a length of the CRC is 19 bits, the polar code is used for performing coding, a length of the mother code of the polar code is 512 bits, a single antenna is used for transmission, 4 repetitions are made after coding (i.e., 4*512=2048 bits), eight transmissions are needed, and currently the 3th transmission is performed. Then, the transmitter performs the following operations. A 19-bit cyclic redundancy check is performed on 23-bit data to be transmitted by using the following formula generator polynomial to obtain a 19-bit check result:

$$g=X^{19}+X^5+X^2+X+1.$$

Then, the XOR operation is performed on the 19-bit check result by using a mask for representing the number of antenna ports to obtain a new check result. Since the single antenna is used for transmission, the 19-bit check result remains unchanged.

The XOR operation is then performed on a 16-bit cell radio network temporary identifier and the 19-bit check result. Since the lengths are different, in operation, the last 16 bits in the 19-bit check result are selected for operation to obtain the new check result.

In addition, the XOR operation may be performed on the highest 3 bits of the 19-bit check result and the beam identifier.

Then, the new check result is concatenated with the data to be transmitted to obtain 42-bit new data (the 19-bit check result is placed after 23-bit data to be transmitted).

The polar code coding is then performed on the 42-bit new data with a code rate of 1/12, and 512-bit coded data is obtained.

The 512-bit coded data is repeated for 4 times to obtain 2048-bit data.

The 2048-bit data is scrambled by using the beam identifier to obtain 2048-bit scrambled data.

The third segment of data of the above scrambled data is extracted and transmitted.

In the scrambled data, the starting point of each segment is mod(L_Mother*Repeat, Num_Seg)+(Seg_ID−1)*floor (L_Mother/Num_Seg). L_Mother is the length of the mother code, Num_Seg is the total number of transmissions, and Seg_ID is the current number of transmissions. The sequence number of a starting bit of the third transmission is mod (512*4, 8)+(3−1)*floor(512/8)=0+2*64=128, that is, the 128th bit (the sequence number starts from 0; and the number range is 0, 1, 2, 3, . . . , 2046, 2047). The number of bits transmitted each time is 512 or 1024 or 1536. The extracted bits are as shown in FIG. 4.

Embodiment 4

The embodiment further provides an apparatus for sending data. The apparatus is configured to implement the above-mentioned embodiments. What has been described will not be repeated. As used below, a term "module" may be software, hardware or a combination thereof capable of implementing predetermined functions. The apparatus in the embodiment described below is preferably implemented by software, but implementation by hardware or by a combination of software and hardware is also possible and conceived.

Figure 5:
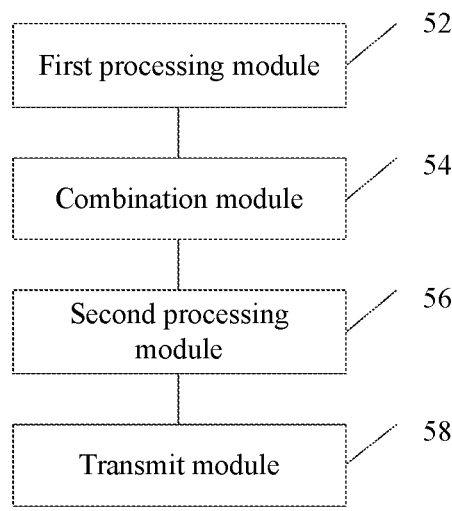
FIG. 5 is a structural block diagram of an apparatus for sending data according to an embodiment of the present invention.

It is to be noted that various modules included in the apparatus may be implemented by a processor in the network side device; or may, of course, also be implemented by a specific logic circuit. In an implementation process, the processor may be a central processing unit (CPU), a microprocessor unit (MPU), a digital signal processor (DSP), a field programmable gate array (FPGA) or the like. FIG. 5 is a structural block diagram of an apparatus for sending data according to an embodiment of the present invention. As shown in FIG. 5, the apparatus includes a first processing module 52, a combination module 54, a second processing module 56, and a transmit module (or transmitter) 58. The first processing module 52 is configured to perform first predetermined processing on data to be transmitted to obtain a first processing result.

The combination module 54 is connected to the first processing module 52, and is configured to combine the first processing result with the data to be transmitted to obtain concatenated data.

The second processing module 56 is connected to the combination module 54, and is configured to perform second predetermined processing on the concatenated data to obtain processed data. The processed data includes a plurality of segments of data, and each segment of the plurality of segments of data corresponds to a data transmission. In some embodiments, the first processing module 52, the combination module 54, the second processing module 56 may be collectively referred to as a processor.

The transmit module 58 is connected to the second processing module 56, and is configured to transmit a segment of data in the processed data and corresponding to a current data transmission of a network side device.

Through the above apparatus, the first predetermined processing is performed on the data to be transmitted to obtain the first processing result, and the first processing result is concatenated with the data to be transmitted. The second predetermined processing is performed on the concatenated data. The processed data includes a plurality of segments of data, and each segment of the plurality of segments of data corresponds to a data transmission. A segment of data corresponding to a current data transmission of a network side device is transmitted. That is, each segment of data corresponds to a data transmission, so that the terminal may determine the number of transmissions corresponding to data after the terminal receives the data sent by the network side device, and further determine the number of transmissions of the data transmitted by the network side device. Therefore the problem that the terminal cannot determine in which transmission the received data is transmitted by the network side can be solved.

In other embodiments, the second processing module 56 may further be configured to perform channel coding on the concatenated data to obtain coded data; repeat the coded data for N times to obtain repeated data; and scramble the repeated data by using a specified identifier to obtain scrambled data. N is a positive integer.

It is to be noted that the above specified identifier may include at least one of: a beam identifier, a cell identifier, or a set of terminal identifiers, but not limited thereto.

It is to be noted that the second processing module 56 may further be configured to perform the channel coding on the concatenated data in at least one of following coding manners: a polar code, a low-density parity check code, and a tail biting convolutional code.

It is to be noted that the second processing module 56 may further be configured to perform an XOR operation on a scrambling sequence generated by using the specified identifier and the repeated data to obtain the scrambled data.

It is to be noted that the scrambling sequence includes at least one of: a Gold code, an M-sequence or a ZC sequence.

It is to be noted that the Gold code is a pseudo-random code derived from the M-sequence, and is formed by a modulo-2 addition to displacement of a pair of the M-sequence. The M-sequence is an abbreviation of a maximum length linear shift register sequence, and is a pseudo random sequence, a pseudo noise code or a pseudo random code. The ZC sequence is a Zadoff-Chu sequence.

In other embodiments, the first processing module 52 may further be configured to perform a cyclic redundancy check on the data to be transmitted to obtain first check result; and perform at least one of following operations on the first check result to obtain the first processing result: performing a predetermined operation on the first check result by using a mask for representing the number of antenna ports; and performing an XOR operation on a cell radio network temporary identifier and the first check result.

It is to be noted that in a case of 8 check bits used for the cyclic redundancy check, a generator polynomial g used in performing the cyclic redundancy check includes at least one of: $g=X^8+X^7+X^4+X^3+X+1$, $g=X^8+X^2+X+1$, $g=X^8+X^4+X^3+X+1$, or $g=X^8+X^4+X^3+X^2+1$; in a case of 16 check bits used for the cyclic redundancy check, the generator polynomial g used in performing the cyclic redundancy check includes at least one of: $g=X^{16}+X^{12}+X^5+1$, $g=X^{16}+X^2+X+1$, or $g=X^{16}+X^{14}+X+1$; in a case of 17 check bits used for the cyclic redundancy check, the generator polynomial g used in performing the cyclic redundancy check includes at least one of: $g=X^{17}+X^3+g$ $X^{17}+X^{12}+X^{11}+X^6+X^4+X+1$, or $g=X^{17}+X^{13}+X^{11}+X^{10}+X^7+X^5+X^4+X^3+X+1$; in a case of 18 check bits used for the cyclic redundancy check, the generator polynomial g used in performing the cyclic redundancy check includes at least one of: $g=X^{18}+X^5+X^2+X+1$, $g=X^{18}+X^{16}+X^{15}+X^{13}+X^8+X^5+X^4+X^3+X^2+X+1$, or $g=X^{18}+X^{16}+X^{11}+X^{10}+X^9+X^8+X^6+X^5+X^4+X+1$; in a case of 19 check bits used for the cyclic redundancy check, the generator polynomial g used in performing the cyclic redundancy check includes at least one of: $g=X^{19}+X^5+X^2+X+1$, $g=X^{19}+X^{16}+X^8+X^5+X^4+X^3+X^2+X+1$ or $g=X^{19}+X^{12}+X^9+X^8+X^6+X^5+X^4+X+1$, in a case of 20 check bits used for the cyclic redundancy check, the generator polynomial g used in performing the cyclic redundancy check includes at least one of: $g=X^{20}+X^3+1$, or $g=X^{20}+X^{16}+X^9+X^4+X^3+X^2+1$, or $g=X^{20}+X^{19}+X^{18}+X^{14}+X^6+X^2+X+1$; in a case of 21 check bits used for the cyclic redundancy check, the generator polynomial g used in performing the cyclic redundancy check includes at least one of: $g=X^{21}+X^2+1$, $g=X^{21}+X^{20}+X^{13}+X^{11}+X^7+X^4+X^3+1$, or $g=X^{21}+X^{20}+X^{18}+X^{16}+X^{14}+X^{13}+X^{10}+X^9+X^7+X^3+1$; in a case of 22 check bits used for the cyclic redundancy check, the generator polynomial g used in performing the cyclic redundancy check includes at least one of: $g=X^{22}+X+1$; in a case of 23 check bits used for the cyclic redundancy check, the generator polynomial g used in performing the cyclic redundancy check includes at least one of: $g=X^{23}+X^5+1$; in a case of 24 check bits used for the cyclic redundancy check, the generator polynomial g used in performing the cyclic redundancy check includes at least one of: $g=X^{24}+X^4+X^3+X+1$, $g=X^{24}+X^{23}+X^6+X^5+X+1$, or $g=X^{24}+X^{23}+X^{18}+X^{17}+X^{14}+X^{11}+X^{10}+X^7+X^6+X^4+X^3+X+1$; and in a case of 32 check bits used for the cyclic redundancy check, the generator polynomial g used in performing the cyclic redundancy check includes at least one of: $g=X^{32}+X^7+X^5+X^3+X^2+X+1$, $g=X^{32}+X^{29}+X^{18}+X^{14}+X^3+1$, or $g=X^{32}+X^{14}+X^{12}+X^{10}+X^9+X^8+X^4+X^3+X+1$. A power exponent of X is used for indicating a check bit used in in performing the cyclic redundancy check.

It is to be noted that in a case where the antenna port is a single-antenna port, the mask includes the number L_CRC of binary bits "0". In a case where the antenna port is a 2-antenna port, the mask includes the number L_CRC of binary bits "1". In a case where the antenna port is a 4-antenna port, the mask includes: the number floor (L_CRC/2) of binary strings "01" and the number mod (L_CRC, 2) of binary bits "0". In a case where the antenna port is an 8-antenna port, the mask includes: the number floor(L_CRC/2) of binary strings "10" and the number mod(L_CRC, 2) of binary bits "1". In a case where the antenna port is a 16-antenna port, the mask includes one of: the number floor(L_CRC/4) of binary strings "0110" and the number mod(L_CRC, 4) of binary bits "1"; the floor (L_CRC/4) binary strings "0110" and a plurality of bits from a first bit to a mod(L_CRC, 4)-th bit of the floor(L_CRC/4) binary strings "0110"; or the floor(L_CRC/4) binary strings "0110" and a plurality of bits from a last bit to a mod (L_CRC, 4)-th bit from the last bit of the floor(L_CRC/4) binary strings "0110". In a case where the antenna port is a 32-antenna port, the mask includes one of: the number floor(L_CRC/4) binary strings "1001" and the number mod (L_CRC, 4) of binary bits "0"; the floor(L_CRC/4) of binary strings "1001" and a plurality of bits from a first bit to a mod(L_CRC, 4)-th bit of the floor(L_CRC/4) binary strings "1001"; or the floor(L_CRC/4) binary strings "1001" and a plurality of bits from a last bit to a mod(L_CRC, 4)-th bit from the last bit of the floor(L_CRC/4) binary strings "1001". L_CRC includes at least one of: the number of bits of the cyclic redundancy check, the number of bits of a cell identifier, the number of bits of a beam identifier, the number of bits of the cell radio network temporary identifier, or the number of bits of the number of bits of the cyclic redundancy check minus the number of reserved bits. The number of reserved bits is any integer from 0 to 16, floor( ) is a round-down operation, mod(L_CRC, 2) is a modulo-2 operation on the L_CRC, and mod(L_CRC, 4) is a modulo-4 operation on the L_CRC.

It is to be noted that the first processing module 52 may further be configured to perform at least one of the following operations: performing the XOR operation on the mask and the first check result; and performing a modulo-2 addition operation on the mask and the first check result.

It is to be noted that the first processing module 52 may further be configured to perform at least one of the following operations: in a case where the number of bits of the cell radio network temporary identifier is less than the number of bits of the first check result, adding the predetermined number of binary bits "0" to a head or tail of the cell radio network temporary identifier to obtain a first cell radio network temporary identifier, and performing the XOR operation on the first cell radio network temporary identifier and the first check result; or in a case where the number of bits of the cell radio network temporary identifier is greater than the number of bits of the first check result, adding the predetermined number of binary bits "0" to a head or tail of the first check result to obtain a second check result, and performing the XOR operation on the cell radio network temporary identifier and the second check result. The predetermined number is an absolute value of a difference between the number of bits of the cell radio network identifier and the number of bits of the first check result.

In other embodiments, the combination module 54 may further be configured to perform at least one of the following operations: placing the first processing result before the data to be transmitted to obtain the concatenated data; placing the first processing result in the middle of the data to be transmitted to obtain the concatenated data; and placing the first processing result after the data to be transmitted to obtain the concatenated data. Every M data bits to be transmitted in the data to be transmitted are inserted with a bit of data of the first processing result and all bits of the first processing result are inserted into the data to be transmitted to obtain the concatenated data. M is a natural number.

It is to be noted that at least two segments of data in a plurality of segments of data have overlapping data, or no overlapping data exists in the plurality of segments of data, and the present invention is not limited thereto.

It is to be noted that the above apparatus may, but may not necessarily, be located in a network side device, such as a base station.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 4

The embodiment of the present invention further provides an apparatus for processing data. Various modules included in the apparatus may be implemented by a processor in a terminal; or may of course be implemented by a specific logic circuit. In an implementation process, the processor may be a central processing unit (CPU), a microprocessor unit (MPU), a digital signal processor (DSP), a field programmable gate array (FPGA) or the like.

Figure 6:
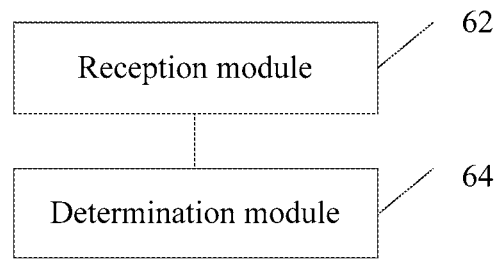
FIG. 6 is a structural block diagram of an apparatus for processing data according to an embodiment of the present invention.

FIG. 6 is a structural block diagram of the apparatus for processing data according to the embodiment of the present invention. As shown in FIG. 6, the apparatus includes a reception module 62 and a determination module 64.

The reception module 62 is configured to receive data sent by a network side device. The data is a segment of data among data obtained from pre-processing data to be transmitted by the network side device.

The determination module 64 is connected to the reception module 62 and is configured to determine, according to preset correspondence between segments of data and the numbers of data transmissions and the received data, the number of data transmissions corresponding to the received data.

Through the above apparatus, the number of data transmissions corresponding to the received data is determined according to the preset correspondence between the segments of data and the numbers of data transmissions, so that the terminal knows the number of transmissions of the received data transmitted by the network side, thereby solving the problem that the terminal cannot determine in which transmission the received data is transmitted by the network side.

It is to be noted that the correspondence may be predefined between the network side device and the terminal, and may also be configured in advance by the network side device for the terminal, but is not limited thereto.

It is to be noted that the correspondence may include: correspondence between starting points of the segments of data in the pre-processed data and the numbers of data transmissions.

In other embodiments, the determination module 54 may further be configured to obtain a starting position of the received data in the pre-processed data; and search, according to the starting position, the correspondence for the number of data transmissions matching the starting position.

It is to be noted that the above apparatus may, but may not necessarily, be located in a terminal.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 5

Figure 7:
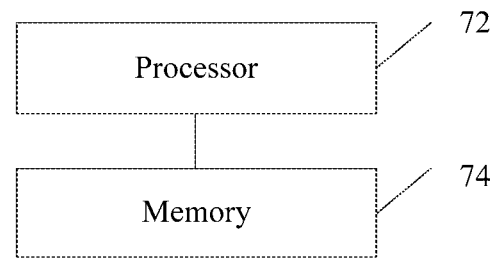
FIG. 7 is a structural block diagram of a network side device according to an embodiment of the present invention.

The embodiment of the present invention further provides a network side device. FIG. 7 is a structural block diagram of the network side device according to the embodiment of the present invention. As shown in FIG. 7, the network side device includes a processor 72 and a memory 74.

The processor 72 is configured to: perform first predetermined processing on data to be transmitted to obtain a first processing result; combine the first processing result with the data to be transmitted to obtain concatenated data; perform second predetermined processing on the concatenated data to obtain processed data; and transmit a segment of data in the processed data and corresponding to a current data transmission of the network side device. The processed data comprises a plurality of segments of data, and each segment of the plurality of segments of data corresponds to a data transmission.

The memory 74 is coupled to the processor 72.

Through the above network side device, the first predetermined processing is performed on the data to be transmitted to obtain the first processing result, and the first processing result is concatenated with the data to be transmitted. The second predetermined processing is performed on the concatenated data. The processed data includes a plurality of segments of data, and each segment of the plurality of segments of data corresponds to a data transmission. A segment of data corresponding to a current data transmission of a network side device is transmitted. That is, each segment of data corresponds to a data transmission, so that the terminal may determine the number of transmissions corresponding to data after the terminal receives the data sent by the network side device, and further determine the number of transmissions of the data transmitted by the network side device. Therefore the problem that the terminal cannot determine in which transmission the received data is transmitted by the network side can be solved.

In other embodiments, the processor 72 may further be configured to perform channel coding on the concatenated data to obtain coded data; repeat the coded data for N times to obtain repeated data; and scramble the repeated data by using a specified identifier to obtain scrambled data. N is a positive integer.

It is to be noted that the above specified identifier may, but may not necessarily, include at least one of: a beam identifier, a cell identifier, or a set of terminal identifiers.

It is to be noted that the processor 72 may further be configured to perform the channel coding on the concatenated data in at least one of following coding manners: a polar code, a low-density parity check code, and a tail biting convolutional code.

It is to be noted that the processor 72 may further be configured to perform an XOR operation on a scrambling sequence generated by using the specified identifier and the repeated data to obtain the scrambled data.

It is to be noted that the scrambling sequence includes at least one of: a Gold code, an M-sequence or a ZC sequence.

It is to be noted that the Gold code is a pseudo-random code derived from the M-sequence, and is formed by a modulo-2 addition to displacement of a pair of the M-sequence. The M-sequence is an abbreviation of a maximum length linear shift register sequence, and is a pseudo random sequence, a pseudo noise code or a pseudo random code. The ZC sequence is a Zadoff-Chu sequence.

In other embodiments, the processor 72 may further be configured to perform a cyclic redundancy check on the data to be transmitted to obtain first check result; and perform at least one of following operations on the first check result to obtain the first processing result: performing a predetermined operation on the first check result by using a mask for representing the number of antenna ports; and performing an XOR operation on a cell radio network temporary identifier and the first check result.

It is to be noted that in a case of 8 check bits used for the cyclic redundancy check, a generator polynomial g used in performing the cyclic redundancy check includes at least one of: $g=X^8+X^7+X^4+X^3+X+1$, $g=X^8+X^2+X+1$, $g=X^8+X^4+X^3+X+1$, or $g=X^8+X^4+X^3+X^2+1$; in a case of 16 check bits used for the cyclic redundancy check, the generator polynomial g used in performing the cyclic redundancy check includes at least one of: $g=X^{16}+X^{12}+X^5+1$ $g=X^{16}+X^2+X+1$, or $g=X^{16}+X^{14}+X+1$; in a case of 17 check bits used for the cyclic redundancy check, the generator polynomial g used in performing the cyclic redundancy check includes at least one of: $g=X^{17}+X^3+1$, $g=X^{17}+X^{12}+X^{11}+X^6+X^4++1$, or $g=X^{17}+X^{13}+X^{11}+X^{10}+X^7+X^5+X^4+X^3+X+1$; in a case of 18 check bits used for the cyclic redundancy check, the generator polynomial g used in performing the cyclic redundancy check includes at least one of: $g=X^{18}+X^5+X^2+X+1$, $g=X^{18}+X^{16}+X^{15}+X^{13}+X^8+X^5+X^4+X^3+X^2+X+1$, or $g=X^{18}+X^{16}+X^{11}+X^{10}+X^9+X^8+X^6+X^5+X^4+X+1$; in a case of 19 check bits used for the cyclic redundancy check, the generator polynomial g used in performing the cyclic redundancy check includes at least one of: $g=X^{19}+X^5+X^2++1$, $g=X^{19}+X^{16}+X^8+X^5+X^4+X^3+X^2+++X^{12}+X^9+X^8+X^6+X^5+X^4+X^2+1$, or $g=X^{19}+1$; in a case of 20 check bits used for the cyclic redundancy check, the generator polynomial g used in performing the cyclic redundancy check includes at least one of: $g=X^{20}+X^3+1$, $g=X^{20}+X^{16}+X^9+X^4+X^3+2+1$, or $g=X^{20}+X^{19}+X^{18}+X^{14}+X^6+X^2+X+1$; in a case of 21 check bits used for the cyclic redundancy check, the generator polynomial g used in performing the cyclic redundancy check includes at least one of: $g=X^{21}+X^2+1$, $g=X^{21}+X^{20}+X^{13}+X^{11}+X^7+X^4+X+1$, or $g=X^{21}+X^{20}+X^{18}+X^{16}+X^{14}+X^{13}+X^{10}+X^9+X^7+X^3+1$; in a case of 22 check bits used for the cyclic redundancy check, the generator polynomial g used in performing the cyclic redundancy check includes at least one of: $g=X^{22}+X+1$; in a case of 23 check bits used for the cyclic redundancy check, the generator polynomial g used in performing the cyclic redundancy check includes at least one of: $g=X^{23}+X^5+1$; in a case of 24 check bits used for the cyclic redundancy check, the generator polynomial g used in performing the cyclic redundancy check includes at least one of: $g=X^{24}+X^4+X^3+X+1$, $g=X^{24}+X^{23}+X^6+X^5++1$, or $g=X^{24}+X^{23}+X^{18}+X^{17}+X^{14}+X^{11}+X^{10}+X^7+X^6+X^5+X^4+X^3+X+1$; and in a case of 32 check bits used for the cyclic redundancy check, the generator polynomial g used in performing the cyclic redundancy check includes at least one of: $g=X^{32}+X^7+X^5+X^3+X^2+X+1$, $g=X^{32}+X^{29}+X^{18}+X^{14}+X^3+1$, or $g=X^{32}+X^{14}+X^{12}+X^{10}+X^9+X^8+X^4+X^3+X+1$. A power exponent of X is used for indicating a check bit used in in performing the cyclic redundancy check.

It is to be noted that in a case where the antenna port is a single-antenna port, the mask includes the number L_CRC of binary bits "0". In a case where the antenna port is a 2-antenna port, the mask includes the number L_CRC of binary bits "1". In a case where the antenna port is a 4-antenna port, the mask includes: the number floor (L_CRC/2) of binary strings "01" and the number mod (L_CRC, 2) of binary bits "0". In a case where the antenna port is an 8-antenna port, the mask includes: the number floor(L_CRC/2) of binary strings "10" and the number mod(L_CRC, 2) of binary bits "1". In a case where the antenna port is a 16-antenna port, the mask includes one of: the number floor(L_CRC/4) of binary strings "0110" and the number mod(L_CRC, 4) of binary bits "1"; the floor (L_CRC/4) binary strings "0110" and a plurality of bits from a first bit to a mod(L_CRC, 4)-th bit of the floor(L_CRC/4) binary strings "0110"; or the floor(L_CRC/4) binary strings "0110" and a plurality of bits from a last bit to a mod (L_CRC, 4)-th bit from the last bit of the floor(L_CRC/4) binary strings "0110". In a case where the antenna port is a 32-antenna port, the mask includes one of: the number floor(L_CRC/4) of binary strings "1001" and the number mod(L_CRC, 4) binary bits "0"; the floor(L_CRC/4) of binary strings "1001" and a plurality of bits from a first bit to a mod(L_CRC, 4)-th bit of the floor(L_CRC/4) binary strings "1001"; or the floor(L_CRC/4) binary strings "1001" and a plurality of bits from a last bit to a mod(L_CRC, 4)-th bit from the last bit of the floor(L_CRC/4) binary strings "1001". L_CRC includes at least one of: the number of bits of the cyclic redundancy check, the number of bits of a cell identifier, the number of bits of a beam identifier, the number of bits of the cell radio network temporary identifier, or the number of bits of the number of bits of the cyclic redundancy check minus the number of reserved bits. The number of reserved bits is any integer from 0 to 16, floor( ) is a round-down operation, mod(L_CRC, 2) is a modulo-2 operation on the L_CRC, and mod(L_CRC, 4) is a modulo-4 operation on the L_CRC.

It is to be noted that the processor 72 may further be configured to perform at least one of the following operations: performing the XOR operation on the mask and the first check result; and performing a modulo-2 addition operation on the mask and the first check result.

It is to be noted that the processor 72 may further be configured to perform at least one of the following operations: in a case where the number of bits of the cell radio network temporary identifier is less than the number of bits of the first check result, adding the predetermined number of binary bits "0" to a head or tail of the cell radio network temporary identifier to obtain a first cell radio network temporary identifier, and performing the XOR operation on the first cell radio network temporary identifier and the first check result; or in a case where the number of bits of the cell radio network temporary identifier is greater than the number of bits of the first check result, adding the predetermined number of binary bits "0" to a head or tail of the first check result to obtain a second check result, and performing the XOR operation on the cell radio network temporary identifier and the second check result. The predetermined number is an absolute value of a difference between the number of bits of the cell radio network identifier and the number of bits of the first check result.

In other embodiments, the processor 72 may further be configured to perform at least one of the following operations: placing the first processing result before the data to be transmitted to obtain the concatenated data; placing the first processing result in the middle of the data to be transmitted to obtain the concatenated data; and placing the first processing result after the data to be transmitted to obtain the concatenated data. Every M data bits to be transmitted in the data to be transmitted are inserted with a bit of data of the first processing result and all bits of the first processing result are inserted into the data to be transmitted to obtain the concatenated data. M is a natural number.

It is to be noted that at least two segments of data in a plurality of segments of data have overlapping data, or no overlapping data exists in the plurality of segments of data, and the present invention is not limited thereto.

Embodiment 6

Figure 8:
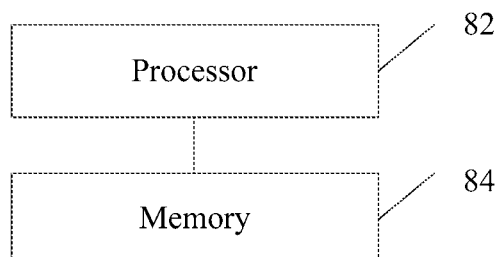
FIG. 8 is a structural block diagram of a terminal according to an embodiment of the present invention.

The embodiment of the present invention further provides a terminal. FIG. 8 is a structural block diagram of the terminal according to the embodiment of the present invention. As shown in FIG. 8, the terminal includes: a processor 82 and a memory 84.

The processor 82 is configured to receive data sent by a network side device, and determine, according to preset correspondence between segments of data and the numbers of data transmissions and the received data, the number of data transmissions corresponding to the received data. The data is a segment of data among data obtained from pre-processing data to be transmitted by the network side device.

The memory 84 is coupled to the processor 82.

Through the above terminal, the number of data transmissions corresponding to the received data is determined according to the preset correspondence between the segments of data and the numbers of data transmissions, so that the terminal knows the number of transmissions of the received data transmitted by the network side, thereby solving the problem that the terminal cannot determine in which transmission the received data is transmitted by the network side.

It is to be noted that the correspondence may be pre-agreed between the network side device and the terminal, and may also be configured in advance by the network side device for the terminal, but is not limited thereto.

It is to be noted that the correspondence may include: correspondence between starting points of the segments of data in the pre-processed data and the numbers of data transmissions.

In other embodiments, the processor 82 may further be configured to obtain a starting position of the received data in the pre-processed data; and search, according to the starting position, the correspondence for the number of data transmissions matching the starting position.

The embodiment of the present invention further provides a system. The system includes the network side device described in the embodiment 5 and the terminal described in the embodiment 6.

Embodiment 7

It is to be noted that, in the embodiment of the present invention, the method for sending data or the method for processing data, if implemented in the form of software functional modules and sold or used as independent products, may also be stored in a computer-readable storage medium. Based on this understanding, the technical solutions provided by the embodiments of the present invention substantially, or the part contributing to the related art, may be embodied in the form of a software product. The computer software product is stored in a storage medium and includes several instructions for enabling a computer device (which may be a personal computer, a server or a network device, etc.) to perform all or part of the method provided by each embodiment of the present invention. The foregoing storage medium includes: a USB flash disk, a mobile hard disk, a read only memory (ROM), a magnetic disk, an optical disk or another medium capable of storing program codes. In this way, the embodiment of the present invention is not limited to any particular combination of hardware and software.

Correspondingly, the embodiment of the present invention further provides a storage medium. The storage medium includes stored programs which, when executed, perform the method described in any one of the above-mentioned embodiments.

In other embodiments, the storage medium may, but may not necessarily, include a USB flash disk, a read-only memory (ROM), a random access memory (RAM), a mobile hard disk, a magnetic disk, an optical disk or another medium capable of storing program codes.

The embodiment of the present invention further provides a processor. The processor is configured to execute programs which, when executed, perform the steps in the method of any one of the above-mentioned embodiments.

In other embodiments, for specific examples in the embodiment, reference may be made to the examples described in the above embodiments and implementation modes, and repetition will not be made in the embodiment.

It should be understood that "one embodiment" or "an embodiment" mentioned throughout the specification means that a particular feature, structure or characteristic related to the embodiments is included in at least one embodiment of the present invention. Therefore, the appearance of the phrase "in one embodiment" or "in an embodiment" in various places throughout the specification is not necessarily referring to the same embodiment. In addition, these particular features, structures or characteristics may be concatenated in one or more embodiments in any suitable manner. It should be understood that in various embodiments of the present invention, the sequence numbers of the above processes do not mean the execution order and the execution order of the above processes should be determined according to their functions and internal logics, which should not limit the implementation processes of the present invention in any improper way. The sequence numbers of the embodiments described above of the present invention are merely for ease of description and do not indicate superiority and inferiority of the embodiments.

It is to be noted that as used herein, the term "comprising", "including" or any other variant thereof is intended to encompass a non-exclusive inclusion so that a process, method, article or apparatus that includes a series of elements not only includes the expressly listed elements but also includes other elements that are not expressly listed or are inherent to such a process, method, article or apparatus. In the absence of more restrictions, the elements defined by the statement "including a . . . " do not exclude the presence of additional identical elements in the process, method, article or apparatus that includes the elements.

It should be understood that the devices and the methods disclosed in the embodiments of the present invention may be implemented in other ways. The device embodiments described above are merely illustrative. For example, the unit division is merely a logical function division, and, in practice, the unit division may be implemented in other ways. For example, multiple units or components may be concatenated or may be integrated into another system, or some features may be omitted or not executed. In addition, coupling, direct coupling or communication connections between the presented or discussed components may be indirect coupling or communication connections, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to practical requirements to achieve objects of the solutions in the embodiments of the present invention.

Moreover, various function units in the embodiments of the present invention may all be integrated in one processing unit, or each unit may be used as a separate unit, or two or more units may be integrated into one unit. The integrated function unit may be implemented by hardware or may be implemented by hardware plus a software function unit.

It may be understood by those skilled in the art that all or part of the steps in the method embodiments described above may be implemented by hardware related to program instructions, these programs may be stored in a computer-readable storage medium, and, when executed, these programs execute steps including the method embodiments described above; and the preceding storage medium includes various media capable of storing program codes, such as a removable storage device, a read-only memory (ROM), a magnetic disk or an optical disk.

Alternatively, the above-mentioned integrated unit of the present invention may also be stored in the computer-readable storage medium if implemented in the form of a software function module and sold or used as an independent product. Based on this understanding, the technical solutions provided by the embodiments of the present invention substantially, or the part contributing to the related art, may be embodied in the form of a software product. The computer software product is stored in a storage medium and includes several instructions for enabling a computer device (which may be a personal computer, a server or a network device, etc.) to perform all or part of the method provided by each embodiment of the present invention. The foregoing storage medium includes various media capable of storing program codes, such as a removable storage device, a ROM, a magnetic disk or an optical disk.

The above are only embodiments of the present invention and are not intended to limit the present invention. It is easy for those skilled in the art to conceive modifications or substitutions within the technical scope of the present invention. These modifications or substitutions are within the scope of the present invention. Therefore, the protection scope of the present invention is subject to the scope of the appended claims.

INDUSTRIAL APPLICABILITY

In the embodiments of the present invention, the first predetermined processing is performed on data to be transmitted to obtain the first processing result; the first processing result is concatenated with the data to be transmitted to obtain concatenated data; the second predetermined processing is performed on the concatenated data to obtain processed data; and a segment of data in the processed data and corresponding to a current data transmission of the network side device is transmitted. Thus, the problem, in the related art, that the terminal cannot determine in which transmission the received data is transmitted by the network side is solved.

What is claimed is:

1. A network communication method, comprising:
    performing, by a network side device, a first processing on data to be transmitted to obtain a first processing result, the first processing comprising:

performing a cyclic redundancy check on the data to obtain a first check result, and performing an XOR operation on i) a cell radio network temporary identifier having 16 bits and ii) last 16 bits of the first check result to obtain the first processing result;

performing, by the network side device, a second processing on concatenated data to obtain processed data, wherein the second processing comprises polar encoding the first processing result repeatedly with the concatenated data to generate a plurality of segments of polar encoded data; and transmitting, by the network side device, the plurality of segments of polar encoded data.

2. The network communication method of claim 1, wherein performing the second processing on the concatenated data to obtain the processed data further comprises:

coding, by the network side device, the concatenated data to obtain coded data; and scrambling, by the network side device, the coded data to obtain the processed data.

3. The network communication method of claim 1, wherein each of the plurality of segments of polar encoded data corresponds to a data transmission of the network side device.

4. A network side device, comprising:

a processor configured to:

performing a first processing on data to be transmitted to obtain a first processing result, the first processing comprising:

performing a cyclic redundancy check on the data to obtain a first check result, and performing an XOR operation on i) a cell radio network temporary identifier having 16 bits and ii) last 16 bits of the first check result to obtain the first processing result;

performing, by the network side device, a second processing on concatenated data to obtain processed data, wherein the second processing comprises polar encoding the first processing result repeatedly with the concatenated data to generate a plurality of segments of polar encoded data; and a transmitter, coupled to the processor, and configured to:

transmit the plurality of segments of polar encoded data.

5. The network side device of claim 4, wherein the processor is further configured to:

code the concatenated data to obtain coded data; and scramble the coded data to obtain the processed data.

6. The network side device of claim 4, wherein each of the plurality of segments of polar encoded data corresponds to a data transmission of the network side device.

7. A network communication method, comprising:

receiving, by a terminal, a plurality of segments of data processed by a network side device;

wherein the processed data is obtained by performing a first processing on data to obtain a first processing result and a second processing on concatenated data comprising the first processing result concatenated with the data;

wherein the first processing comprises:

performing a cyclic redundancy check on the data to obtain a first check result, and performing an XOR operation on i) a cell radio network temporary identifier having 16 bits and ii) last 16 bits of the first check result to obtain the first processing result;

wherein the second processing comprises:

polar encoding the first processing result repeatedly with the concatenated data to generate a plurality of segments.

8. A terminal, comprising:

a processor configured to receive a plurality of segments of data processed by a network side device;

wherein the processed data is obtained by performing a first processing on data to obtain a first processing result and a second processing on concatenated data comprising the first processing result concatenated with the data;

wherein the first processing comprises:

performing a cyclic redundancy check on the data to obtain a first check result, and performing an XOR operation on i) a cell radio network temporary identifier having 16 bits and ii) last 16 bits of the first check result to obtain the first processing result;

wherein the second processing comprises:

polar encoding the first processing result repeatedly with the concatenated data to generate a plurality of segments.

* * * * *